US011657723B2

(12) United States Patent
Nakajima et al.

(10) Patent No.: US 11,657,723 B2
(45) Date of Patent: May 23, 2023

(54) MANAGEMENT DEVICE (71) Applicant: HONDA MOTOR CO., LTD., Tokyo (JP)

(72) Inventors: Kei Nakajima, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 17/032,139

(22) Filed: Sep. 25, 2020

(65) Prior Publication Data
US 2021/0097872 A1   Apr. 1, 2021

(30) Foreign Application Priority Data

Sep. 30, 2019 (JP) .............................. JP2019-179139

(51) Int. Cl.
| | |
|---|---|
| G08G 5/00 | (2006.01) |
| H04W 24/08 | (2009.01) |
| B64C 39/02 | (2023.01) |
| G05D 1/10 | (2006.01) |
| G05D 1/00 | (2006.01) |
| B64D 47/08 | (2006.01) |
| H04N 23/60 | (2023.01) |

(Continued)

(52) U.S. Cl.
CPC ......... *G08G 5/0073* (2013.01); *B64C 39/024* (2013.01); *B64D 47/08* (2013.01); *G05D 1/0094* (2013.01); *G05D 1/104* (2013.01); *H04N 23/64* (2023.01); *H04W 24/08* (2013.01); *B64U 10/13* (2023.01); *B64U 2101/30* (2023.01); *G05D 2201/0207* (2013.01)

(58) Field of Classification Search
CPC combination set(s) only.
See application file for complete search history.

(56) References Cited

U.S. PATENT DOCUMENTS

| 10,262,140 B2* | 4/2019 | Smith .................. G06F 21/575 |
| 2020/0007384 A1* | 1/2020 | Mueck .................. H04W 12/06 |

(Continued)

FOREIGN PATENT DOCUMENTS

| FR | 3103036 A1 * | 5/2021 | ........... G05D 1/0027 |
| JP | 2009-020774 | 1/2009 | |

OTHER PUBLICATIONS

Japanese Office Action with English translation dated Aug. 3, 2021, 5 pages.

*Primary Examiner* — Maceeh Anwari
(74) *Attorney, Agent, or Firm* — Rankin, Hill & Clark LLP (57) ABSTRACT

A management device allows: an information acquisition unit to acquire information that identifies an unmanned aerial vehicle that is an investigation target; a flight position determination unit to determine a flight position of the unmanned aerial vehicle that is the investigation target at a certain point in time; a search unit to search for one or more other unmanned aerial vehicles having a photographing function and positioned around the unmanned aerial vehicle that is the investigation target at the certain point in time; and an acquisition assist processing unit to assist acquisition of photographed data taken by the one or more other unmanned aerial vehicles that are searched for. Further, the management device may perform the above processing using communications through a blockchain network to cooperate with the blockchain network.

5 Claims, 6 Drawing Sheets

(51) Int. Cl.
*B64U 10/13* (2023.01)
*B64U 101/30* (2023.01)

(56) References Cited

U.S. PATENT DOCUMENTS

2020/0162489 A1* 5/2020 Bar-Nahum ........ H04L 63/1433
2021/0088337 A1* 3/2021 Koubaa ................ G05D 1/104

* cited by examiner

MANAGEMENT DEVICE

INCORPORATION BY REFERENCE

The present application claims priority under 35 U.S.C. § 119 to Japanese Patent Application No. 2019-179139 filed on Sep. 30, 2019. The content of the application is incorporated herein by reference in its entirety.

BACKGROUND OF THE INVENTION

Field of the Invention

The present invention relates to a management device.

Description of the Related Art

A monitoring information collection system is disclosed as one example of a device capable of managing a status of a moving body, the monitoring information collection system using vehicle equipment having a dedicated short range communication (DSRC) function and a function of a dashboard camera (see, e.g., Japanese Patent Laid-Open No. 2009-20774). In the system, a predetermined transmission request is transmitted from equipment inside a vehicle that has caused an incident to equipment inside a vehicle within a DSRC area or a fixed device provided to a road, and vehicle equipment that has directly received the transmission request or that has received the transmission request through a so-called road vehicle communications transmits an image collected using a dashboard camera as a DSRC wireless signal.

Meanwhile, unmanned aerial vehicles called drones are expected to be used for various applications such as aerial photography business, delivery business, and disaster relief, and many such unmanned aerial vehicles have a photographing function.

However, unmanned aerial vehicles of such types have no DSRC function that is to be applied to vehicles, and it is difficult to apply the technique in Japanese Patent Laid-Open No. 2009-20774 unless the technique is modified. In addition, a user who controls an unmanned aerial vehicle is positioned away from the unmanned aerial vehicle, and thus, it is difficult to require the user to provide an image taken of an incident situation.

Therefore, it is an object of the present invention to make it easier to acquire photographed information of, e.g., an incident situation of an unmanned aerial vehicle.

SUMMARY OF THE INVENTION

In order to attain the above object, a management device according to an aspect of the present invention includes: an information acquisition unit that acquires information identifying an unmanned aerial vehicle that is an investigation target among a plurality of unmanned aerial vehicles; a flight position determination unit that determines a flight position of the unmanned aerial vehicle that is the investigation target at a certain point in time; a search unit that searches for one or more other unmanned aerial vehicles having a photographing function and positioned around the flight position at the certain point in time; and an acquisition assist processing unit that assists acquisition of photographed data of the one or more other unmanned aerial vehicles that are searched for, the photographed data being photographed at at least the certain point in time.

In the above configuration, the information acquisition unit may have a communications status detection unit that detects a communications status of each of the plurality of unmanned aerial vehicles, and if the communications status detection unit detects an unmanned aerial vehicle in which communications are broken down on the basis of the communications status, the information acquisition unit may define the unmanned aerial vehicle detected as the investigation target, and the flight position determination unit may determine a flight position of the unmanned aerial vehicle that is the investigation target at a time when communications breakdown occurs as a flight position of the unmanned aerial vehicle that is the investigation target at the certain point in time.

In the above configuration, the flight position may include a flight altitude at the time when communications breakdown occurs, and the search unit may search for one or more other unmanned aerial vehicles within a predetermined range relative to the flight altitude.

In the above configuration, the acquisition assist processing unit may assist acquisition of photographed data including data at the time when communications breakdown occurs.

In the above configuration, if the acquisition assist processing unit, on a basis of provision availability data indicating whether or not the photographed data of the one or more other unmanned aerial vehicles that are searched for can be provided, determines that it is possible to provide the photographed data, the acquisition assist processing unit may assist the acquisition of the photographed data, and if the acquisition assist processing unit determines that it is impossible to provide the photographed data, the acquisition assist processing unit may cancel assisting the acquisition of the photographed data.

In the above configuration, the search unit, on a basis of a relationship between the flight position and positions of the one or more other unmanned aerial vehicles, may search for one or more other unmanned aerial vehicles whose photographing directions include the flight position.

In the above configuration, partial or complete processing of any one of the information acquisition unit, the flight position determination unit, the search unit, and the acquisition assist processing unit may include communications through a blockchain network.

The aspect of the present invention makes it easier to acquire photographed information of, e.g., an incident situation of an unmanned aerial vehicle.

DETAILED DESCRIPTION OF THE PREFERRED EMBODIMENT

Hereinafter, one embodiment of the present invention will be described in detail with reference to the drawings.

Figure 1:
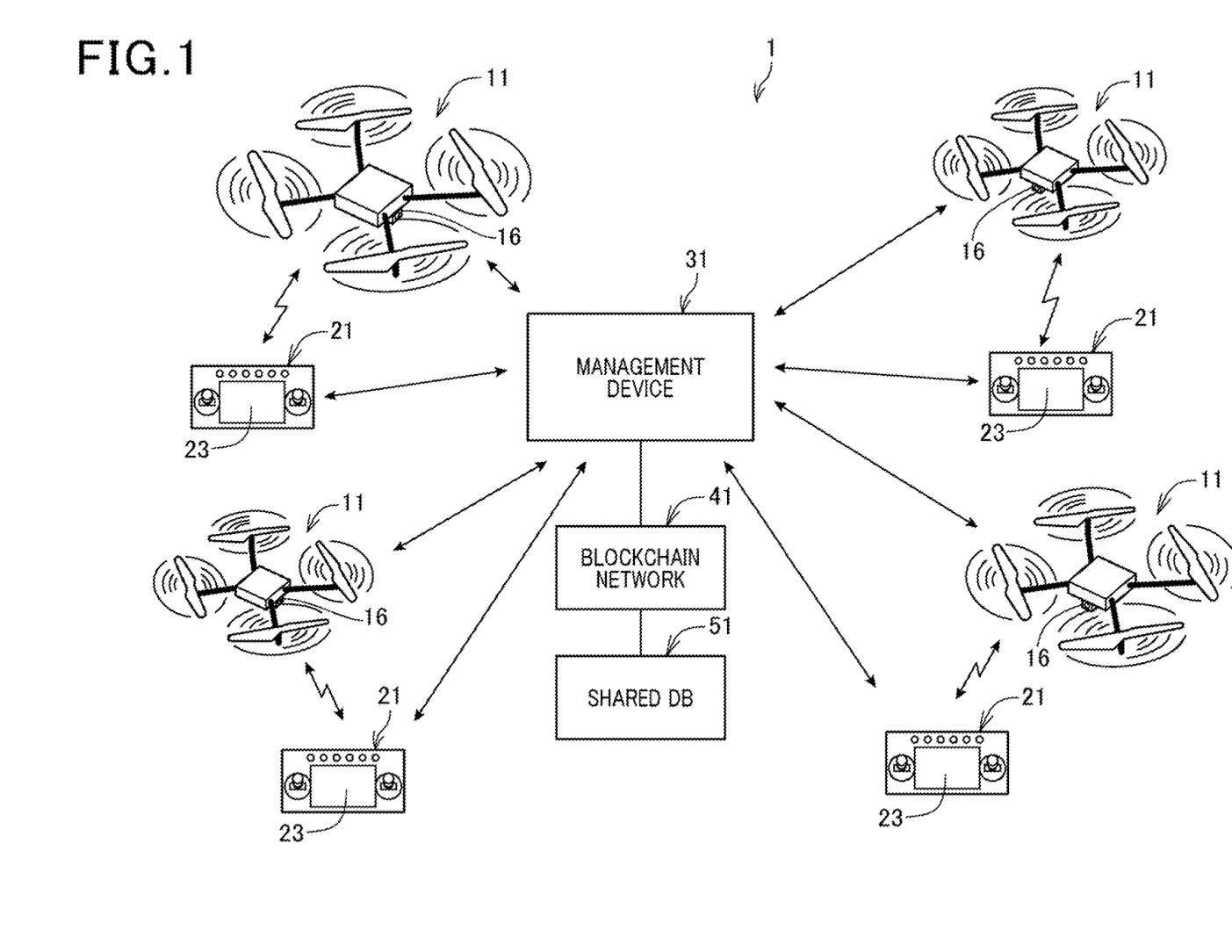
FIG. 1 shows an aerial vehicle management system having a management device according to an embodiment of the present invention.

FIG. 1 shows an aerial vehicle management system having a management device according to an embodiment of the present invention. An aerial vehicle management system 1 includes a plurality of unmanned aerial vehicles 11, a plurality of controllers 21 that control the respective unmanned aerial vehicles 10, a management device 31 that performs processing of the unmanned aerial vehicles 11, a blockchain network 41, and a shared database (hereinafter "database" is referred to as "DB") 51. Each unmanned aerial vehicle 11 is referred to as a "drone," and is capable of flying in the air. Each unmanned aerial vehicle 11 is used for various applications such as use of photographing its surrounding scenery, use of delivering, e.g., goods and postal items, and disaster relief.

The aerial vehicle management system 1 is used when the plurality of unmanned aerial vehicles 11 are flying in the air. Therefore, one unmanned aerial vehicle 11 during flight may probably be photographed by one or more other unmanned aerial vehicles 11.

Figure 2:
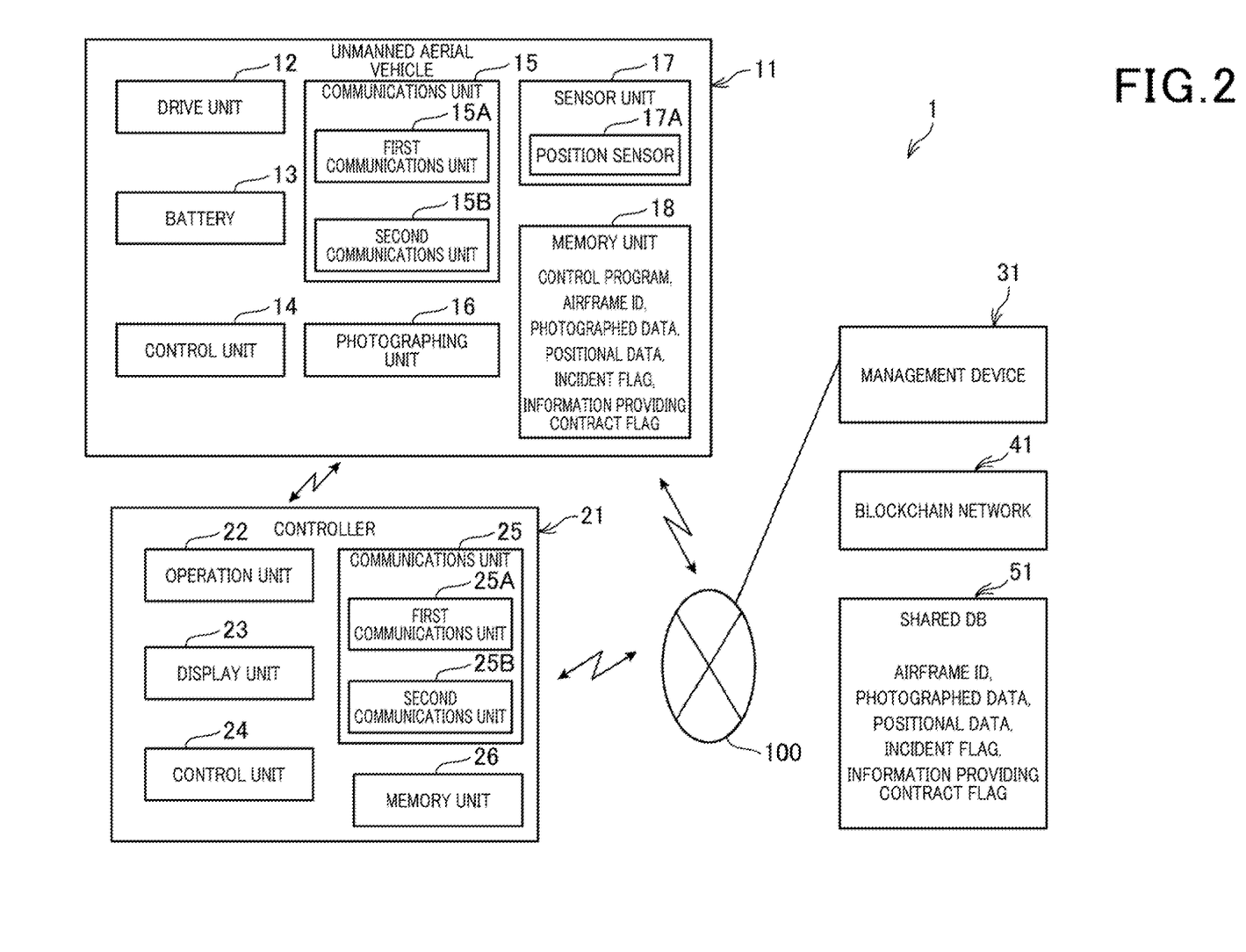
FIG. 2 is a block diagram showing configurations of an unmanned aerial vehicle and a controller together with its surrounding configuration.

FIG. 2 shows configurations of the unmanned aerial vehicle 11 and the controller 21 together with its surrounding configuration. The unmanned aerial vehicle 11 includes a drive unit 12, a battery 13, a control unit 14, a communications unit 15, a photographing unit 16, a sensor unit 17, and a memory unit 18 (memory). The drive unit 12 is a drive motor that rotationally drives multiple propellers provided to the unmanned aerial vehicle 11, and is driven by electric power from the battery 13 under control of the control unit 14. Note that, instead of the drive motor, other power sources such as a gasoline-powered engine may be applied, and instead of, or in addition to, the battery 13, a power generator may be provided.

The control unit 14 has at least one microprocessor, and controls each unit of the unmanned aerial vehicle 11 in accordance with a control program memorized in the memory unit 18. The communications unit 15 includes a first communications unit 15A that communicates directly with the controller 21, and a second communications unit 15B that communicates indirectly with the controller 21. The direct communications refer to communications without going through a relay device such as another computer or network (including a base station and a relay station). The indirect communications refer to communications through a relay device such as another computer or network (including a base station and a relay station). In the present embodiment, communications are performed using a mobile communications line 100.

To the first communications unit 15A, any one of a short-, medium-, or long-range wireless communication module is applied. For example, to the first communications unit 15A, a communication module capable of communicating directly with, e.g., a controller 21 using a system, such as wireless local area network (LAN) or Bluetooth®, for general-purpose equipment, or a system, such as Futaba advanced spread spectrum technology (FASST) or frequency-hopping spread spectrum (FHSS), for specific-purpose equipment (for example, a wireless-controlled object) is applied.

To the second communications unit 15B, a mobile communication module is applied. The second communications unit 15B enables communicative connection with the mobile communications line 100 (FIG. 2) having many base stations, making it possible to expand the communication range, compared to the communications using the first communications unit 15A. In addition, the second communications unit 15B can be connected to the Internet. Note that the management device 31 is connected to the Internet to be able to communicate with each unmanned aerial vehicle 11 and the controller 21 through the Internet and the mobile communications line 100.

The photographing unit 16 (corresponding to a camera) has a photographing sensor to acquire photographed data taken of scenery around the unmanned aerial vehicle 11. The sensor unit 17 includes a position sensor 17A that detects a position of the unmanned aerial vehicle 11. The position sensor 17A is a sensor capable of detecting a three-dimensional position of the unmanned aerial vehicle 11, and commonly-known sensors such as a global positioning system (GPS) sensor, an orientation sensor, and a gyroscope sensor are widely applicable.

The memory unit 18 memorizes a control program to be executed by the control unit 14, and various types of data. Examples of the various types of data include an airframe identification data (ID) serving as identification information that identifies the unmanned aerial vehicle 11, photographed data acquired by the photographing unit 16, positional data detected by the position sensor 17A, an incident flag, and an information providing contract flag. The photographed data is associated with the positional data so as to be capable of determining a photographed position. For example, data indicating the photographed position may be embedded into the photographed data.

The control unit 14 monitors the state of each unit of the unmanned aerial vehicle 11, and the incident flag is set to value 0 when each unit is in a normal state, and is set to value 1 when any abnormality occurs (e.g., the disabled status of communications of the communications unit 15).

The information providing contract flag is a flag that can be set by a manager (e.g., a manipulator) who manages the unmanned aerial vehicle 11. In the present embodiment, if the manager (e.g., the manipulator) of the unmanned aerial vehicle 11 preliminarily concludes a contract in which the photographed data taken by the unmanned aerial vehicle 11 is permitted to provide, the information providing contract flag is set to value 1. In contrast, if the manager does not permit to provide the photographed data, the information providing contract flag is set to value 0.

The photographed data, the positional data, the incident flag, and the information providing contract flag which are memorized in the memory unit 18 are continuously uploaded to the management device 31 while being associated with the airframe ID. The control unit 14 of the unmanned aerial vehicle 11 may independently execute this upload or may passively execute this upload in accordance with a request from the management device 31.

The controller 21 is a device having a function of transmitting various commands to the unmanned aerial vehicle 11. Note that the controller 21 is not limited to a dedicated manipulation device, and may be a general purpose device such as a tablet device or personal computer. As shown in FIG. 2, the controller 21 includes an operation unit 22, a display unit 23 (display), a control unit 24, a communications unit 25, and a memory unit 26 (memory). The operation unit 22 has a handle that receives an operation of the manipulator. The manipulator is a person who operates the controller 21 to allow the unmanned aerial vehicle 11 to fly, and is also referred to as a user or operator. The handle is a commonly-known handle such as a stick, a switch, a lever, a touch panel, a keyboard or a mouse.

The display unit 23 is a commonly-known display device such as a liquid crystal display device, and displays various types of information to the manipulator under control of the control unit 24. For example, similar to a commonly-known controller for drone, the display unit 23 can display photographed image corresponding to the photographed data that is being taken by the unmanned aerial vehicle 11, and various types of notification information. In addition to the display unit 23, an audio output device or the like capable of outputting various sound may be provided.

The control unit 24 has at least one microprocessor, and controls each unit of the controller 21 in accordance with a control program memorized in the memory unit 26. As with the communications unit 15 of the unmanned aerial vehicle 11, the communications unit 25 includes a first communications unit 25A that communicates directly with the unmanned aerial vehicle 11, and a second communications unit 25B that communicates indirectly with the unmanned aerial vehicle 11, and is capable of communicating directly or indirectly with the unmanned aerial vehicle 11. This allows transmission of a signal associated with the instruction from the manipulator to the unmanned aerial vehicle 11 through the direct or indirect communications, making it possible to control, e.g., flight of the unmanned aerial vehicle 11.

Further, the controller 21 can be communicatively connected with the mobile communications line 100 through the second communications unit 25B, or communicate with the management device 31 through the Internet. The memory unit 26 memorizes a control program to be executed by the control unit 24, and various types of data. The various types of data include information necessary for communications with the unmanned aerial vehicle 11 and the management device 31, and information transmitted from the management device 31. In addition, the photographed data from the unmanned aerial vehicle 11 may be memorized into the memory unit 18.

The management device 31, the blockchain network 41, and the shared DB 51 are respectively configured as one or more cloud computers, one or more networks using cloud computers and one or more cloud databases. However, they do not have to be limited to such cloud computers, etc.

Figure 3:
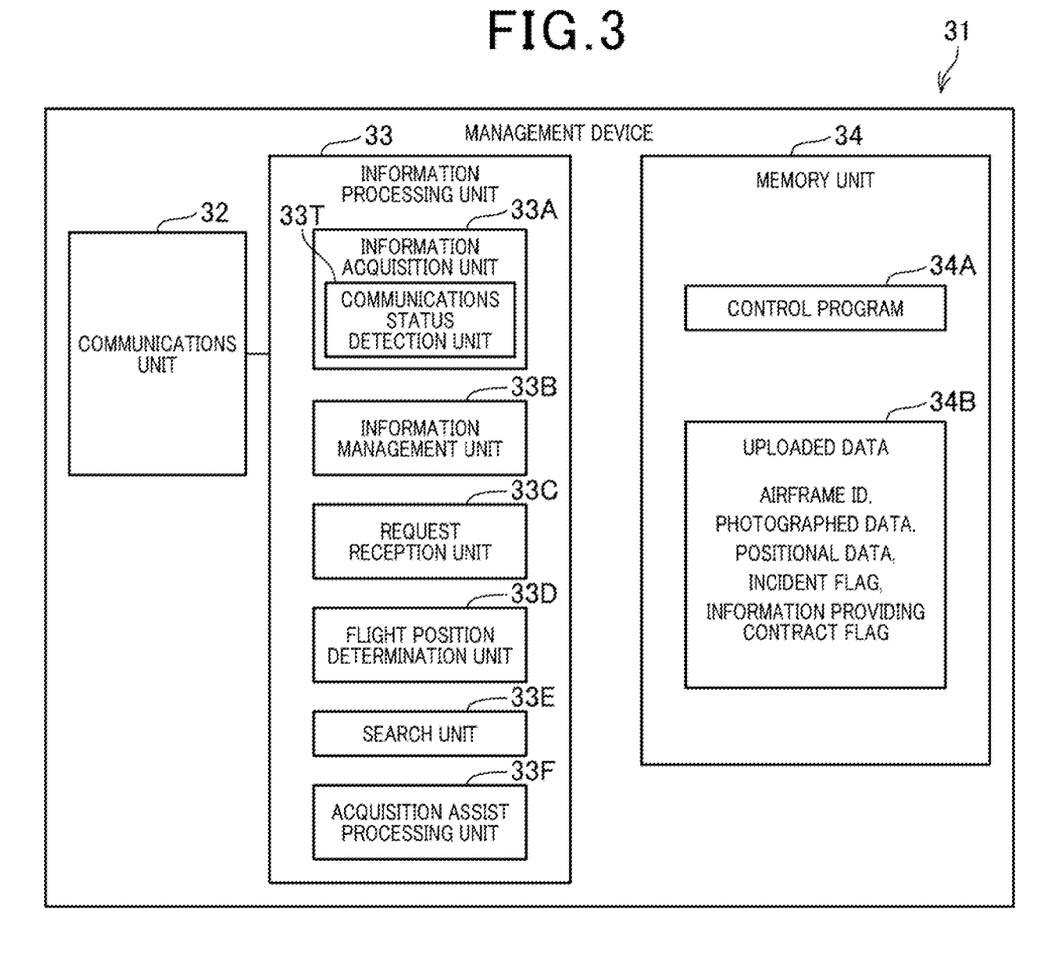
FIG. 3 shows a configuration of the management device.

FIG. 3 shows a configuration of the management device 31.

The management device 31 includes a communications unit 32, an information processing unit 33, and a memory unit 34 (memory). A communication module is applied to the communications unit 32, the communication module communicatively connecting with the mobile communications line 100 through the Internet to communicate with the unmanned aerial vehicle 11 and the controller 21, and being in data communications with the shared DB 51 through the blockchain network 41.

The information processing unit 33 has a processor, and executes a control program 34A memorized in the memory unit 34 to serve as an information acquisition unit 33A, an information management unit 33B, a request reception unit 33C, a flight position determination unit 33D, a search unit 33E, an acquisition assist processing unit 33F, and other units. Note that, the information acquisition unit 33A, the information management unit 33B, the request reception unit 33C, the flight position determination unit 33D, the search unit 33E, the acquisition assist processing unit 33F, and other units may be configured as dedicated hardware.

The information acquisition unit 33A can acquire various types of information transmitted from, e.g., the unmanned aerial vehicle 11 and the controller 21 through the communications unit 32. For example, the information acquisition unit 33A can acquire various types of data, such as the airframe ID, the photographed data, the positional data, the incident flag, and the information providing contract flag, which is memorized in the memory unit 18 of the unmanned aerial vehicle 11.

In addition to the control program 34A, various types of data that have been acquired through the information acquisition unit 33A are memorized into the memory unit 34 as uploaded data 34B. The uploaded data 34B is uploaded to the shared DB 51 through the blockchain network 41. This allows the shared DB 51 to store, e.g., the airframe ID that identifies the plurality of unmanned aerial vehicles 11, the photographed data, the positional data, the incident flag, and the information providing contract flag. For example, access to the shared DB 51 enables, e.g., for each airframe ID, determination of a flight position and photographed data at any given point in time, determination of a time when the incident flag is switched, and determination of a current value of the information providing contract flag, for example.

Here, the blockchain network 41 stores a request including a transaction content generated in the network, and each block stores information such as a hash value indicating the content of an immediately preceding generated block to achieve technology of coupling the blocks together and managing data. Holding the blocks in which all nodes constituting the blockchain network 41 are coupled together makes it difficult to falsify the above various types of data.

Note that, for example, the photographed data taken by each unmanned aerial vehicle 11 is coded to be stored in the shared DB 51. This makes it easier to ensure security of, e.g., the photographed data.

The information acquisition unit 33A further includes a communications status detection unit 33T that detects a communications status with the plurality of unmanned aerial vehicles 11. This communications status detection unit 33T, using a commonly-known communication monitoring technology, continuously monitors whether or not each unmanned aerial vehicle 11 is communicable to be able to promptly detect an unmanned aerial vehicle 11 in which communications breakdown occurs during flight. In addition, the communications status detection unit 33T can identify the airframe ID of the unmanned aerial vehicle 11 in which communications breakdown occurs.

Regarding such an unmanned aerial vehicle 11 in which communications breakdown occurs is detected by the communications status detection unit 33T, the incident flag stored in the shared DB 51 is rewritten to value 1. As can be seen, information record or information change to the shared DB 51 is performed through the blockchain network 41, thereby enabling management of history of each data in the shared DB 51.

The situation where communications are broken down are assumed to be, specifically, a case of collision or crash of the unmanned aerial vehicle 11, or a case of occurrence of a fault such as malfunction.

The information management unit 33B manages information input to or output from the management device 31 to, e.g., manage information memorized in the memory unit 34 and information (information for providing information) transmitted from the management device 31. The request reception unit 33C receives various types of requests from, e.g., the controller 21 or any terminal connected to the Internet.

In the present embodiment, the request reception unit 33C can receive the unmanned aerial vehicle 11 having an incident flag of value 1 as a target unmanned aerial vehicle 11 to be investigated.

The flight position determination unit 33D determines a flight position of the unmanned aerial vehicle 11 that is the investigation target at a certain point in time, and accesses the shared DB 51 through the blockchain network 41, thereby acquiring positional data at a time when the incident flag of the unmanned aerial vehicle 11 that is the investigation target is switched to value 1 (positional data at a time when communications are broken down). Further, in a case where, for example, the airframe ID that identifies the unmanned aerial vehicle 11 (including the unmanned aerial vehicle 11 having an incident flag of value 0) that is the investigation target and a time range that determines a certain point in time are designated through the request reception unit 33C, positional data of the unmanned aerial vehicle 11 corresponding to the airframe ID and the time range is acquired from the shared DB 51 through the blockchain network 41.

The search unit 33E, at a certain point in time (a time when the incident flag of the unmanned aerial vehicle 11 that is an investigation target is switched to value 1, or a time corresponding to the time range requested through the request reception unit 33C), searches for one or more other unmanned aerial vehicles 11 having a photographing function and positioned around the unmanned aerial vehicle 11 that is the investigation target.

In this case, the search unit 33E uses data stored in the shared DB 51 (the airframe ID, and the positional data), and searches for, within a time range around the above certain point in time, one or more other unmanned aerial vehicles 11 having a photographing function and positioned around the unmanned aerial vehicle 11 that is the investigation target. This identifies one or more other unmanned aerial vehicles 11 which may have photographed the unmanned aerial vehicle 11 that is the investigation target. Note that the present embodiment assumes a case where all the unmanned aerial vehicles 11 have a photographing function. If there is an unmanned aerial vehicle 11 having no photographing function, a search limited to the unmanned aerial vehicles 11 having a photographing function may be performed.

Figure 4:
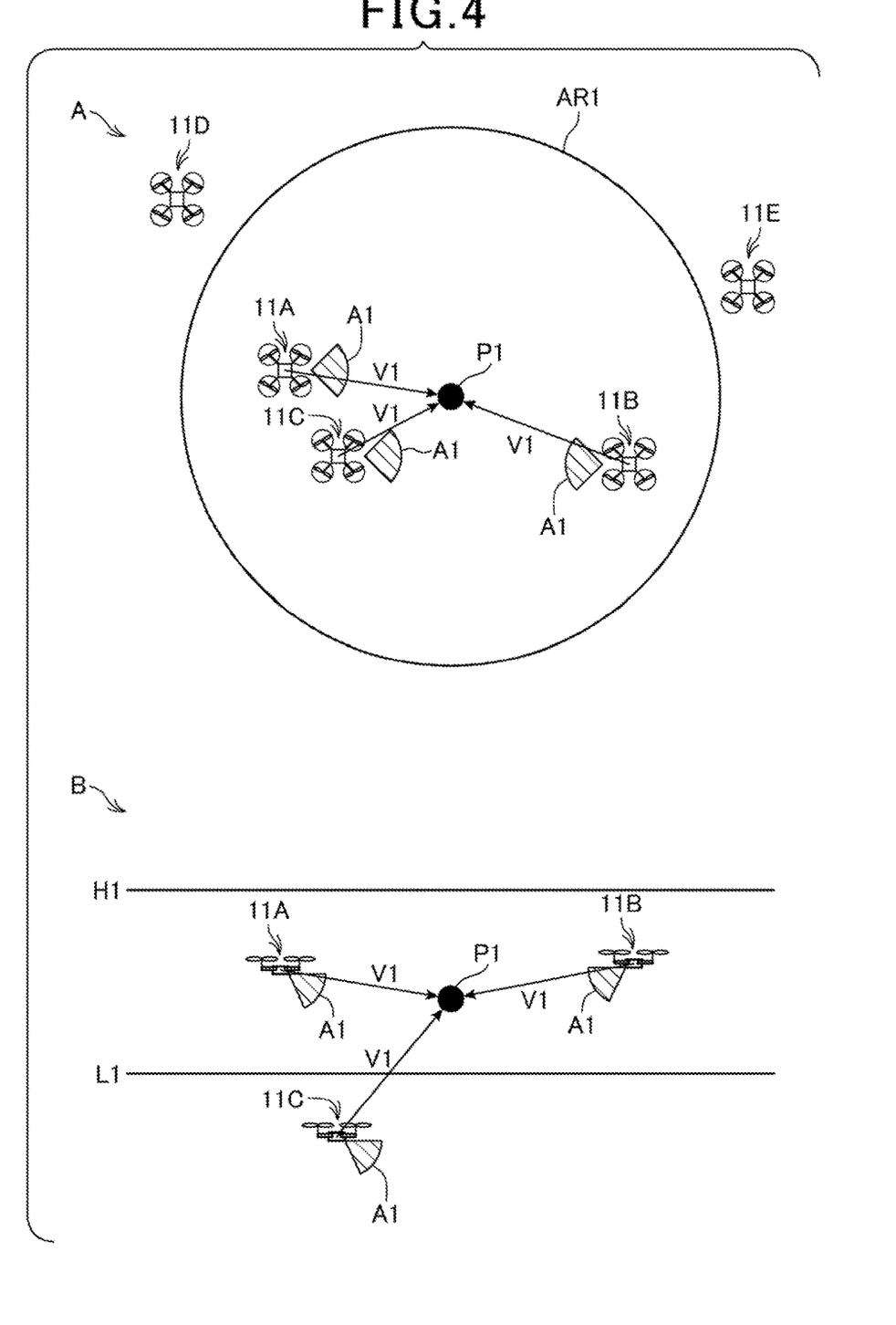
FIG. 4 schematically shows search examples in the search unit of the management device, a reference sign A shows a search range in a horizontal direction relative to a position P1 of an object to be photographed, and a reference sign B shows a search range in an up-down direction relative to an altitude of the position P1 of the object to be photographed.

FIG. 4 schematically shows search examples in the search unit 33E. A reference sign A shows a search range in a horizontal direction relative to a position P1 of the unmanned aerial vehicle 11 that is an investigation target (hereinafter referred to as the "position P1 of the object to be photographed") within a time range around the above certain point in time. A reference sign B shows a search range in an up-down direction relative to an altitude of the position P1 of the object to be photographed. Note that, for the convenience of explanation, FIG. 4 exemplifies a case where there are other unmanned aerial vehicles 11A, 11B, 11C, 11D, and 11E.

As shown in the reference sign A of FIG. 4, the search unit 33E searches for one or more other unmanned aerial vehicles 11 located in a search range AR1 centered around the position P1 of the object to be photographed. Therefore, as shown in the reference sign A of FIG. 4, if there are other unmanned aerial vehicles 11A to 11E, the other unmanned aerial vehicles 11A, 11B, and 11C are identified.

Next, the search unit 33E determines a flight altitude of the position P1 of the object to be photographed, and searches for, among the other unmanned aerial vehicles 11A, 11B, and 11C, one or more other unmanned aerial vehicles 11 included within a predetermined range relative to the flight altitude identified (for example, a range from a height L1 to a height H1 shown in FIG. 4). This identifies the other unmanned aerial vehicles 11A and 11B that may probably have photographed the unmanned aerial vehicle 11 that is the investigation target.

Note that a method for searching for other unmanned aerial vehicles 11 may be changed as appropriate.

For example, the search unit 33E may search for the other unmanned aerial vehicles 11A and 11B whose photographing directions include the position P1 of the object to be photographed (the flight position of the unmanned aerial vehicle 11 that is the investigation target) on the basis of a relationship between the position P1 of the object to be photographed and the positions of the other unmanned aerial vehicles 11A to 11C within the target range AR1. To cite one specific example, vectors V1 from the other unmanned aerial vehicles 11A to 11C to the position P1 of the object to be photographed (see FIG. 4) may be obtained, and on the basis of a positional relationship between the photographing directions of the other unmanned aerial vehicles 11A to 11C (each reference sign A1 in FIGS. 4 and B shows one example of an angle of view at photographing) and the vectors V1, the other unmanned aerial vehicles 11A and 11B whose photographing directions include the position P1 of the object to be photographed may be identified.

Further, the photographing direction is assumed to be changed according to a traveling direction of the unmanned aerial vehicle 11, and on top of that, the photographing direction (including an angle A1 of view) is assumed to vary for each unmanned aerial vehicle 11.

Therefore, a traveling direction of each unmanned aerial vehicle 11 may be determined on the basis of the positional data of each unmanned aerial vehicle 11 stored in the shared DB 51, and, using the traveling direction determined, the photographing direction (corresponding to a photographing direction in view of the traveling direction and the angle A1 of view) may be determined. Also, information (a traveling direction, a horizontal angle of view, and a vertical angle of view) that enables determination of the photographing direction for each unmanned aerial vehicle 11 may be stored in, e.g., the shared DB 51, and on the basis of this information, the photographing direction (corresponding to the photographing direction in view of the traveling direction and the angle A1 of view) may be determined. As an easier method, a mean photographing range of the unmanned aerial vehicles 11 may be preliminarily set, and on the basis of the photographing range, one or more other unmanned aerial vehicles 11 whose photographing directions indicated by the photographing range include the position P1 of the object to be photographed may be determined.

Referring back to FIG. 3, the acquisition assist processing unit 33F assists acquisition of photographed data taken by the other unmanned aerial vehicles 11A and 11B that are searched for. The photographed data in this case refers to data including data at at least the time when the incident flag of the unmanned aerial vehicle 11 that is the investigation target is switched to value 1, or at the time corresponding to a time range requested through the request reception unit 33C. In the present embodiment, the photographed data is photographed data including data before or after the above point in time.

Acquiring the photographed data including data at the above point in time makes it easier to acquire photographed data taken of the unmanned aerial vehicle 11 that is the investigation target at the time when the incident flag is switched to value 1, that is, at the time when abnormality such as communications breakdown occurs. Therefore, this facilitates easy identification of a cause of abnormality (e.g., collision) on the basis of the photographed data. Furthermore, acquiring photographed data including data before or after the above point in time facilitates easier identification of the cause of abnormality.

In the acquisition assist processing unit 33F, the processing of assisting acquisition of the photographed data refers to processing by which a requester who requests acquisition of the photographed data can acquire the photographed data. Examples of the requester in this case include the court, the police, and assurance companies who need to investigate the situation of the incident caused by the unmanned aerial vehicle 11.

For example, the acquisition assist processing unit 33F performs processing of transmitting, to a requester (for example, a terminal device managed by the court), information (hereinafter referred to as "information for providing information") necessary for acquiring an acceptance message from the other unmanned aerial vehicles 11A and 11B identified. The requester, using the information for providing information received, transmits, to the other unmanned aerial vehicles 11A and 11B, an information providing message to receive an automatic acceptance message from the other unmanned aerial vehicles 11A and 11B. Then, the requester, using the automatic acceptance message received, accesses the shared DB 51 to acquire, of the photographed data stored in the shared DB 51, photographed data included within an accepted range through communication. This allows the requester to acquire, of the photographed data taken by the other unmanned aerial vehicles 11A and 11B, the photographed data including the data at the above certain point in time.

The acquisition assist processing unit 33F, as the processing of assisting acquisition of the photographed data, transmits information for providing information (for example, a browse URL, a password) necessary for acquiring the photographed data to a requester (for example, a terminal device managed by the court). The requester, using the information for providing information received, accesses the shared DB 51 to acquire the photographed data including the data at the above certain point in time from the shared DB 51 and decrypts the data on an as-necessary basis.

Note that the management device 31 may notify a manager of the unmanned aerial vehicle 11, from which the photographed data has been provided, that the photographed data has been provided to others, or may provide the manager with a predetermined incentive.

The photographed data is stored in the shared DB 51 with being encrypted. Therefore, when a proper automatic acceptance message is used, the shared DB 51 or the acquisition assist processing unit 33F may decrypt (decode) the photographed data encrypted to transmit the photographed data to the requester, or may notify the requester of key information necessary for decryption to allow the requester to decrypt the photographed data. Note that the photographed data, etc. may be stored in the shared DB 51 without being encrypted.

The case where the requester requests the shared DB 51 to provide information of the photographed data is exemplified, but this is not limiting. For example, the acquisition assist processing unit 33F may acquire the photographed data from the shared DB 51 through communications by the communications unit 32 to forward the data to the requester, or the acquisition assist processing unit 33F may instruct the shared DB 51 to transmit (corresponding to forwarding) the photographed data to the requester. In short, the acquisition assist processing unit 33F may perform processing to allow the requester to acquire the photographed data, and the content of the processing may be changed as appropriate.

Further, the acquisition assist processing unit 33F or the requester accesses the shared DB 51 through the blockchain network 41, and thus, the history of the photographed data is left, making it easier to ensure unfalsification of data.

Figure 5:
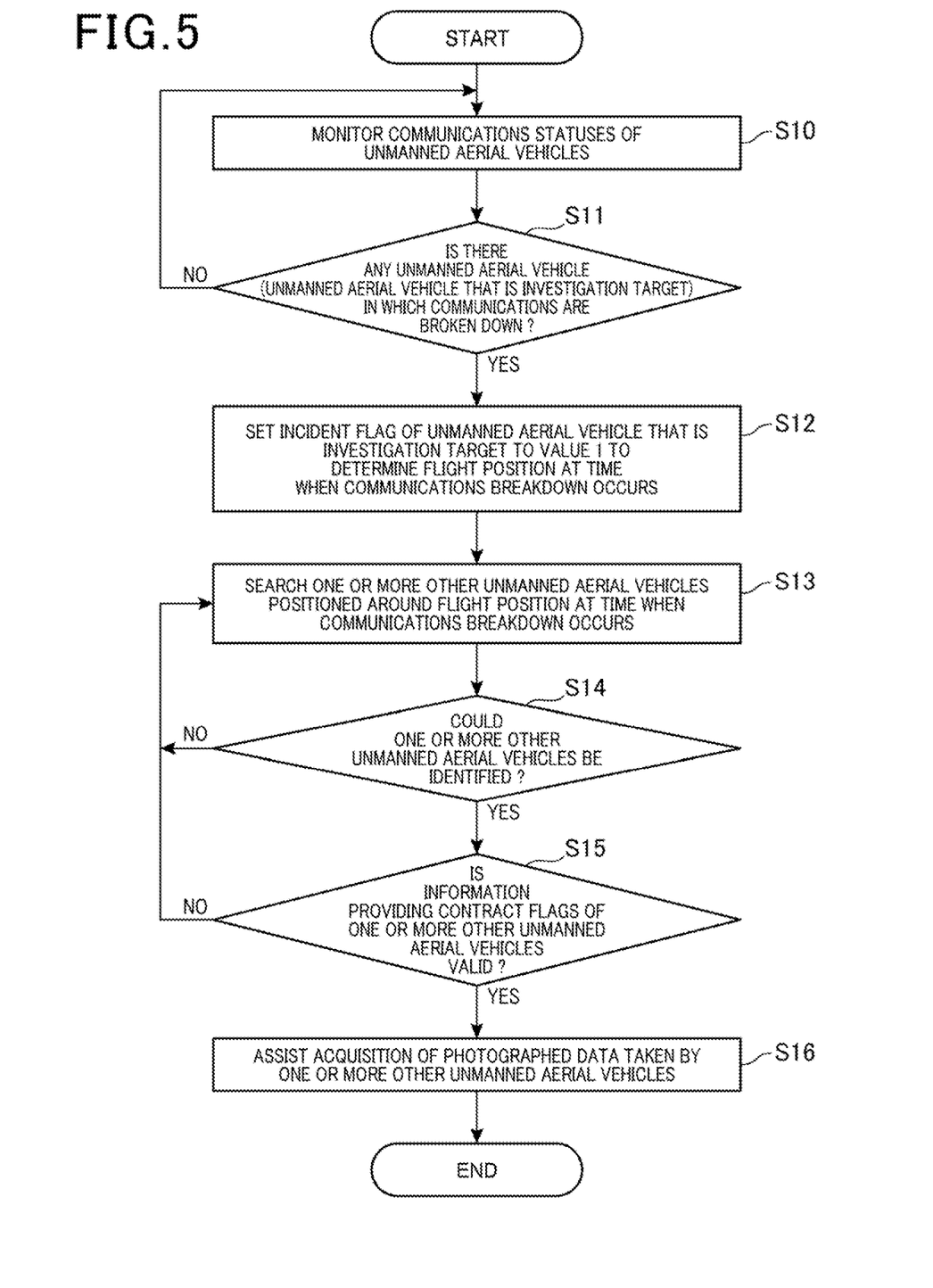
FIG. 5 is a flowchart showing one example of an operation of the management device.

FIG. 5 is a flowchart showing one example of an operation of the management device 31. In this exemplary operation, if the unmanned aerial vehicle 11 in which communications are broken down during flight is detected, acquisition of the photographed data taken of the unmanned aerial vehicle 11 is assisted.

First, the management device 31 allows the communications status detection unit 33T to monitor the communications status of each unmanned aerial vehicle 11 (step S10), and determines presence or absence of the unmanned aerial vehicle 11 (corresponding to the target unmanned aerial vehicle 11 to be investigated) in which communications are broken down during flight (step S11). If there is no unmanned aerial vehicle 11 that is the investigation target (step S11; NO), the processing of the management device 31 proceeds to step S10.

If there is the unmanned aerial vehicle 11 that is the investigation target (step S11; YES), the processing of the management device 31 proceeds to step S12 to allow the information management unit 33B to set the incident flag corresponding to the airframe ID of the unmanned aerial vehicle 11 that is the investigation target to value 1, and to allow the flight position determination unit 33D to determine the flight position at the time when communications breakdown occurs.

Here, the management device 31 allows the information management unit 33B to set the incident flag to value 1, and thus, in uploading, the incident flag stored in the shared DB 51 is overridden to be set to value 1, too.

Next, the processing of the management device 31 proceeds to step S13 to allow the search unit 33E to search for one or more other unmanned aerial vehicles 11 having a photographing function and positioned around the unmanned aerial vehicle 11 that is the investigation target. If the management device 31 cannot identify the one or more other unmanned aerial vehicles 11 (step S14; NO), the processing proceeds to step S13. If the management device 31 can identify the one or more other unmanned aerial vehicles 11 (step S14; YES), the processing proceeds to step S15.

In step S15, the management device 31 allows the information management unit 33B to determine whether or not the information providing contract flags of the one or more other unmanned aerial vehicles 11 identified are value 1 (corresponding to valid). If the information providing contract flag is value 0 (corresponding to invalid), the processing proceeds to processing in step S13, and if the information providing contract flag is value 1, the processing proceeds to step S16.

In the processing in step S16, the management device 31 allows the acquisition assist processing unit 33F to assist acquisition of photographed data taken by the one or more other unmanned aerial vehicles that are searched for. This enables the requester to acquire the photographed data of the unmanned aerial vehicle 11 in which communications are broken down during flight (corresponding to the unmanned aerial vehicle that is the investigation target). This makes it easier to acquire photographed information taken of an incident situation of the unmanned aerial vehicle 11, thereby facilitating easy acquisition of preferred information for identifying a cause of the incident.

As described above, the management device 31 allows: the information acquisition unit 33A to acquire information (e.g., the airframe ID, and the incident flag) that identifies an unmanned aerial vehicle 11 that is an investigation target; the flight position determination unit 33D to determine a flight position of the unmanned aerial vehicle 11 that is the investigation target at a certain point in time (at a time when the incident flag is switched to value 1, or at a time based on a request); and the search unit 33E to search for one or more other unmanned aerial vehicles 11 having a photographing function and positioned around the unmanned aerial vehicle 11 that is the investigation target at the certain point in time. The management device 31 allows the acquisition assist processing unit 33F to assist acquisition of the photographed data taken by the one or more other unmanned aerial vehicles 11 that are searched for. This makes it easier to acquire the photographed data of the unmanned aerial vehicle 11 that is the investigation target.

On top of that, the information acquisition unit 33A has the communications status detection unit 33T that detects communications statuses of the plurality of the unmanned aerial vehicles 11. If the communications status detection unit 33T detects the unmanned aerial vehicle 11 in which communications are broken down on the basis of the communications statuses, the unmanned aerial vehicle 11 is defined as the investigation target, thereby making it easier to acquire the photographed data taken of the unmanned aerial vehicle 11 in which communications are broken down.

Further, the flight position determination unit 33D determines the flight position of the unmanned aerial vehicle 11 in which communications are broken down at the time when communications breakdown occurs, thereby making it easier to acquire the photographed data taken of the unmanned aerial vehicle 11 at the time when communications breakdown occurs, thereby facilitating easy acquisition of preferred information to investigate a cause of the communications breakdown.

Further, the flight position determined by the flight position determination unit 33D includes the flight altitude at the time when communications breakdown occurs, and the search unit 33E searches for one or more other unmanned aerial vehicles 11 within a predetermined range relative to the flight altitude. Therefore, considering the flight altitude facilitates easy identification of the one or more other unmanned aerial vehicles 11 that has photographed the unmanned aerial vehicle 11 at the time when communications breakdown occurs.

In addition, the acquisition assist processing unit 33F assists acquisition of the photographed data including data at the time when communications breakdown occurs, thereby facilitating easy acquisition of preferred information to investigate a cause of the communications breakdown.

Further, if the acquisition assist processing unit 33F, on the basis of the information providing contract flag corresponding to provision availability data indicating whether the photographed data of the one or more other unmanned aerial vehicles 11 that are searched for can be provided, determines that it is possible to provide the photographed data, the acquisition assist processing unit 33F assists the acquisition of the photographed data. If the acquisition assist processing unit 33F determines that it is impossible to provide such photographed data, the acquisition assist processing unit 33F cancels assisting the acquisition of the photographed data. As a result, if it is possible to provide the photographed data, assisting acquisition of the photographed data can be started, promptly, and a will of a person who does not wish provision of the photographed data can be respected. In other words, it is possible to provide the photographed data without the manager of the unmanned aerial vehicle 11, i.e., to achieve so-called smart contract.

Further, the search unit 33E, on the basis of the relationship between the flight position determined by the flight position determination unit 33D and the positions of the one or more other unmanned aerial vehicles 11, searches for one or more other unmanned aerial vehicles 11 whose photographing direction includes the flight position. This also facilitates easy identification of the one or more other unmanned aerial vehicles 11 that have photographed the unmanned aerial vehicle 11 that is the investigation target.

In addition, the management device 31 performs the processing executed by each unit of the management device 31 using communications through the blockchain network 41. This enables achievement of the aerial vehicle management system 1 in cooperation with the blockchain network 41, which is advantageous for, e.g., reducing or preventing falsification of data, and history management. Note that communications through the blockchain network 41 is not limited to the above aspect. Partial or complete processing of any one of the information acquisition unit 33A, the flight position determination unit 33D, the search unit 33E, the acquisition assist processing unit 33F, the unmanned aerial vehicle 11, and the controller 21 may include communications through a blockchain network 41.

The above embodiment is merely one aspect of the present invention, and various changes and applications may be made without departing from the scope of the invention. For example, the above embodiment describes the case where the various types of data of the unmanned aerial vehicle 11 is memorized in the memory unit 34 of the management device 31, and is stored in the shared DB 51. However, this is not limiting.

Figure 6:
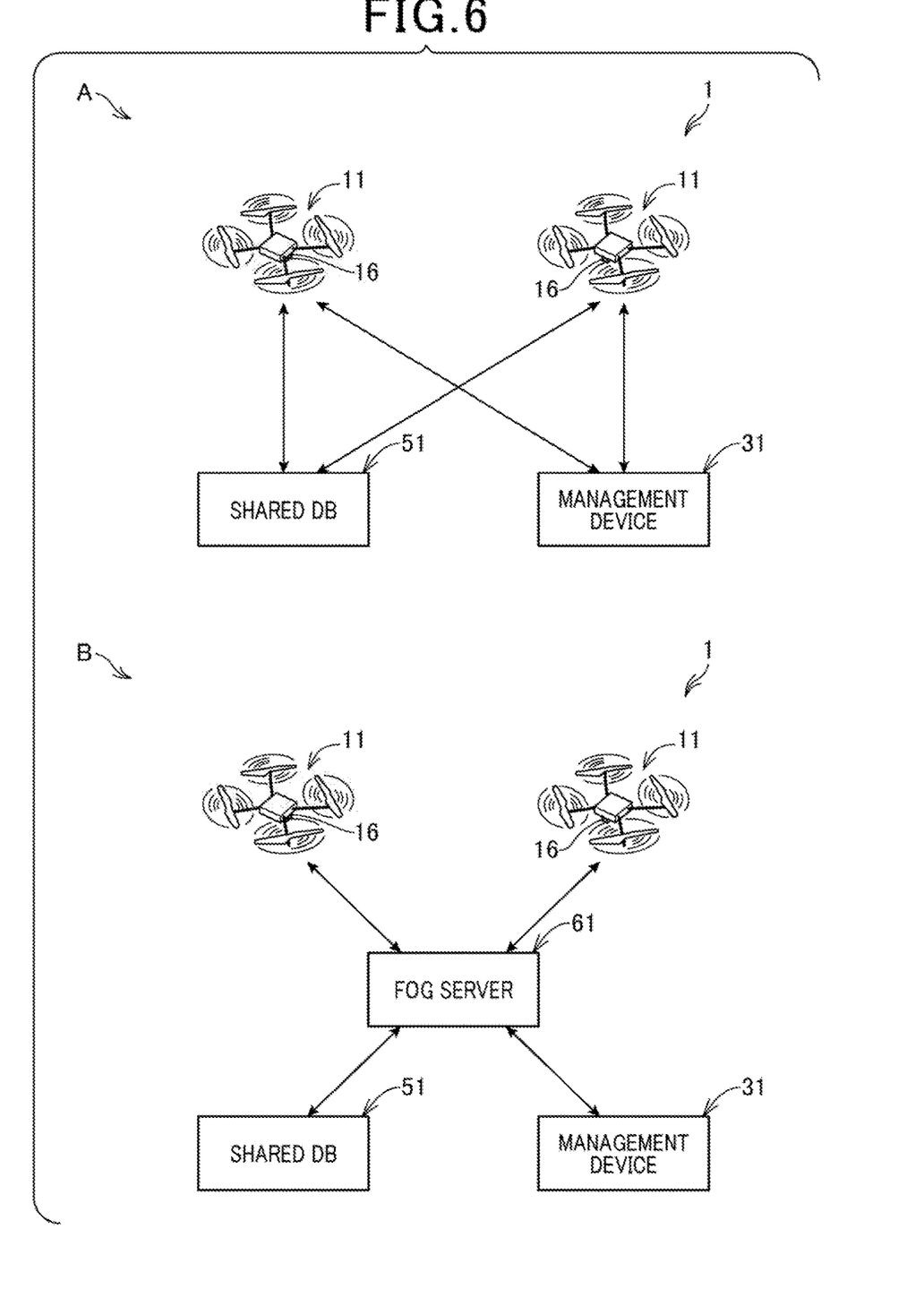
FIG. 6 shows, with reference signs A and B, an aerial vehicle management system according to a modification.

For example, as shown in a reference sign A of FIG. 6, the unmanned aerial vehicle 11 may be configured to be connectable directly to the management device 31 and the shared DB 51 to directly store the various types of data from the unmanned aerial vehicle 11 in the shared DB 51. Further, as shown in a reference sign B of FIG. 6, a fog server 61 may be provided, the fog server 61 serving as a relay server that relays communications between the unmanned aerial vehicle 11, the management device 31, and the shared DB 51, to store the various types of data from the unmanned aerial vehicle 11 through the fog server 61 in the shared DB 51.

Furthermore, the above embodiment exemplifies the case where, as the processing of assisting acquisition of the photographed data, the acquisition assist processing unit 33F transmits, to a requester, information (hereinafter referred to as "information for providing information") necessary for acquiring an acceptance message from the one or more other unmanned aerial vehicles 11 identified. However, this is not limiting.

For example, the acquisition assist processing unit 33F may request the shared DB 51 serving as a holding medium that holds the photographed data taken by the one or more other unmanned aerial vehicles 11 that are searched for to provide the photographed data taken at a certain point in time. Further, the acquisition source of the photographed data is not limited to the data shared DB 51, and the photographed data may be acquired from another unmanned aerial vehicle 11 or from the controller 21 that is a device that the user has. In this case, for example, the acquisition assist processing unit 33F or the requester may request the one or more other unmanned aerial vehicles 11 that are searched for or a user device of the one or more other unmanned aerial vehicles 11 that are searched for to provide photographed data taken at at least a certain point in time.

In addition, attribute information indicating an attribute of a photographed image may be added to the photographed data stored in the shared DB 51 or the like, and this attribute information may be information of which browse range is not as limiting as the browse range of the photographed image. In this case, even if browsing the photographed image is limited by a commonly-known technology, attribute information enables others to help to grasp, e.g., the content of the photographed image, thus facilitating easy data utilization.

Furthermore, any configurations of the unmanned aerial vehicle 11, the controller 21 and the management device 31 can be implemented through, for example, cooperation between hardware and software. Also, the processes corresponding to the respective steps of each flowchart may be divided or merged.

REFERENCE SIGNS LIST

1 Aerial Vehicle Management System
11, 11A to 11E Unmanned Aerial Vehicle
15, 25, 32 Communications Unit
16 Photographing Unit
21 Controller
31 Management Device
33A Information Acquisition Unit
33B Information Management Unit
33C Request Reception Unit
33D Flight Position Determination Unit
33E Search Unit
33F Acquisition Assist Processing Unit
41 Blockchain Network
51 Shared DB

What is claimed is:

1. A management device communicatively connected to a plurality of unmanned aerial vehicles in flight and controllers of respective unmanned aerial vehicles via a communication line, wherein the management device comprises a processor, wherein the processor:
continuously acquires, from each of the plurality of unmanned aerial vehicles, photographed data taken by cameras included in the unmanned aerial vehicles and positional data of the unmanned aerial vehicles, and stores the photographed data and the positional data in a memory;
continuously monitors communications status between the plurality of unmanned aerial vehicles and the management device;
identifies an unmanned aerial vehicle, in which communication is interrupted during flight, as an investigation target among the plurality of unmanned aerial vehicles;
determines the positional data of the unmanned aerial vehicle that is the investigation target at a point in time the communication is interrupted;
identifies, from the plurality of unmanned aerial vehicles, one or more other unmanned aerial vehicles in flight around the unmanned aerial vehicle that is the investigation target; and
is configured to transmit, to a requester, photographed data taken by the camera of the one or more other unmanned aerial vehicles, the photographed data being photographed at the point in time the communication is interrupted.

2. The management device according to claim 1, wherein the positional data includes a flight altitude at the time when communications breakdown occurs, and
the processor searches for the one or more other unmanned aerial vehicles within a predetermined range relative to the flight altitude of the unmanned aerial vehicle that is the investigation target.

3. The management device according to claim 1, wherein the processor, on a basis of provision availability data indicating whether or not the photographed data of the one or more other unmanned aerial vehicles that are searched for can be provided, determines that it is possible to provide the photographed data, the processor is configured to transmit the photographed data to the requester, and if the processor determines that it is impossible to provide the photographed data, the processor is configured to not transmit the photographed data to the requester.

4. The management device according to claim 1, wherein the processor identifies the unmanned aerial vehicles, on a basis of a positional relationship with the unmanned aerial vehicle that is the investigation target at the point in time the communication is interrupted, as the one or more other unmanned aerial vehicles whose photographing directions include the flight position of the unmanned aerial vehicle that is the investigation target.

5. The management device according to claim 1, wherein partial or complete processing of the processor includes communications through a blockchain network.

* * * * *